US006511108B1

(12) United States Patent
Roessner, III et al.

(10) Patent No.: US 6,511,108 B1
(45) Date of Patent: Jan. 28, 2003

(54) LOCKING SEAL WITH DISTORTABLE BODY

(75) Inventors: John K. Roessner, III, Morristown, NJ (US); Richard Dreisbach, North Arlington, NJ (US); George Albert Lundberg, Jr., Pompton Plains, NJ (US)

(73) Assignee: E. J. Brooks Company, Livingston, NJ (US)

( * ) Notice: Subject to any disclaimer, the term of this patent is extended or adjusted under 35 U.S.C. 154(b) by 0 days.

(21) Appl. No.: 09/413,689

(22) Filed: Oct. 7, 1999

(51) Int. Cl.[7] .................................................. F16B 13/04

(52) U.S. Cl. ................... 292/320; 292/307 R; 292/315; 292/318; 292/319; 292/321; 24/53; 24/16 PB; 24/458; 24/453; 411/19; 411/508; 411/509; 411/510

(58) Field of Search ............................ 292/307 R, 315, 292/318, 319, 321, 322, 325, 327; 24/53; 411/41, 60, 48

(56) References Cited

U.S. PATENT DOCUMENTS

| | | | | |
|---|---|---|---|---|
| 2,159,363 A | | 5/1939 | Chaffee | |
| 3,074,134 A | | 1/1963 | Buechler | |
| 3,417,438 A | | 12/1968 | Schuplin | |
| 3,449,799 A | | 6/1969 | Bien | |
| 3,897,162 A | | 7/1975 | Havark | |
| 3,954,295 A | | 5/1976 | Harley | |
| 4,059,300 A | | 11/1977 | Moberg et al. | |
| 4,075,742 A | | 2/1978 | Remark et al. | |
| 4,318,650 A | | 3/1982 | Llauge | |
| 4,502,193 A | * | 3/1985 | Harmon et al. | 24/621 |
| 4,664,432 A | * | 5/1987 | Swift | 292/282 |
| 4,722,562 A | | 2/1988 | Burt | |
| 4,920,618 A | | 5/1990 | Iguchi | |
| 5,116,091 A | | 5/1992 | Swift | |
| 5,120,097 A | | 6/1992 | Fattori et al. | |
| 5,337,503 A | | 8/1994 | Goby | |
| 5,375,954 A | | 12/1994 | Eguchi | |
| 5,378,030 A | * | 1/1995 | Georgopoulos et al. | 292/256.6 |
| 5,509,182 A | | 4/1996 | Nakanishi | |
| 5,524,945 A | | 6/1996 | Georgopoulos et al. | |
| 5,533,767 A | | 7/1996 | Georgopoulos et al. | |
| 5,568,675 A | | 10/1996 | Asami et al. | |
| 5,568,952 A | | 10/1996 | Ruegg | |
| 5,775,860 A | | 7/1998 | Meyer | |
| 5,846,039 A | | 12/1998 | Kirchen et al. | |

FOREIGN PATENT DOCUMENTS

| | | |
|---|---|---|
| CH | 476925 | 8/1969 |
| EP | 0 610 904 A2 | 8/1994 |

* cited by examiner

*Primary Examiner*—Lynne H. Browne
*Assistant Examiner*—Matthew E. Rogers
(74) *Attorney, Agent, or Firm*—Carella Byrne Bain Gilfillan Cecchi et al.; John G. Gilfillan, III; William Squire

(57) ABSTRACT

A tote bin seal for securing sheet material lids via aligned lid apertures includes a flange forming an ID flag attached to a locking device having a hollow core body at one body end and two semi-circular arrays of tangs at the other body end, the tangs formed of stems and reverse hooks or barbs. The body is somewhat oval with a rectangular central portion, the tangs depending from each arcuate end of the oval. Each of the tangs and the body have an interior axially extending triangular stiffening rib. An insert with a head and a bifurcated shank is attached to the flange opposite the body and may be sheared from the flange for insertion into the body core. The shank forms a locking opening which captures a web in the body core for securing the insert locked to the body. The insert prevents the tangs from compressing inwardly to open the seal. The flange has a living hinge so it can be folded over to permit reading ID data from the flange in stacked bins. The flange can be sheared at the body to open the seal.

26 Claims, 5 Drawing Sheets

FIG. 2
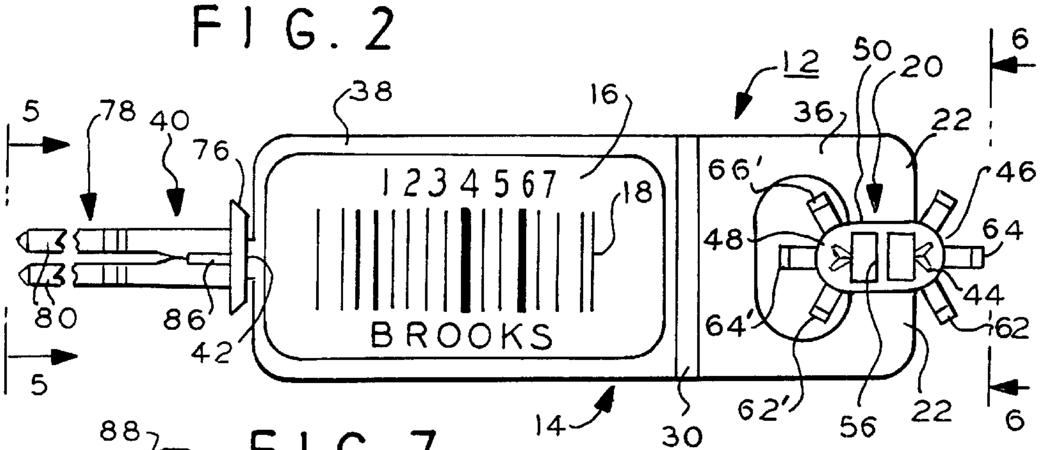
FIG. 7
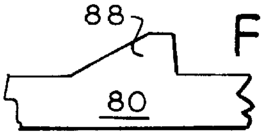
FIG. 3
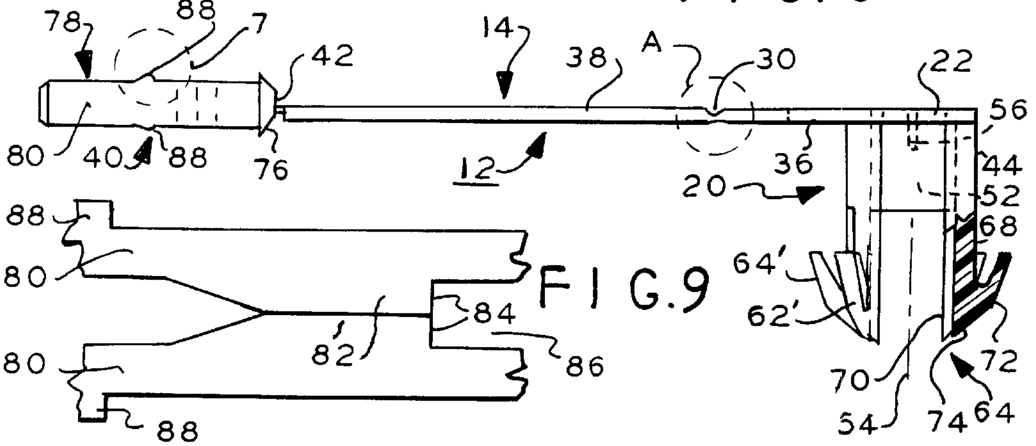
FIG. 9
FIG. 4
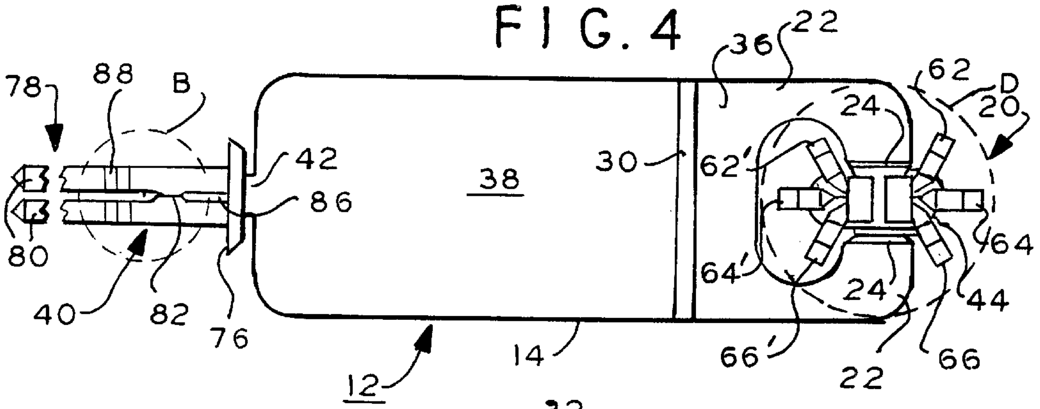
FIG. 8
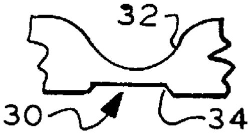

LOCKING SEAL WITH DISTORTABLE BODY

This invention relates to locking seals for securing two apertured members to each other such as overlying lids on tote bins and the like.

Tote bin lid seals are in wide use as are other similar seals. Such seals have a head at one end of a shank and a locking member at the other end of the shank. The seal shank is inserted through aligned apertures in two overlying lids of the bin until the resilient locking member, radially compressed when inserted in the apertures, expands to its natural position and lock the shank to the lids securing the closed lids. Only one side of the lids are accessible for inserting the seals. The problem with these seals is that the apertures on the bin lids tend to vary in dimensions and shape so that a seal of one set of dimensions may not lock to lids having different apertures. For example, the apertures may be a circle in some bins and oval in others. This requires keeping an inventory of different seals for the different size apertures. Such an inventory is costly and cumbersome to maintain. In addition, seals of incorrect dimensions may be used affecting the integrity of the seal.

Such seals may also employ flags, i.e., flanges attached to the seals, for receiving an imprinted identification code, ID, for that seal such as a bar code or serial number. Another problem is that the when the tote bins are stacked one over the other, the flags which normally are flat and extend over the lids, are located beneath the overlying bins of the stack and thus are not readily accessible or readable.

U.S. Pat. No. 2,159,363 discloses a snap fastener having a base formed of rectangular arms. Legs extend from the arms and form a nose. The legs outside edges form a pear shape. A socket portion extends from each leg out of the plane of the leg and are arranged to yield. The legs and socket portions move toward each other when inserted into an opening. After the socket portions pass through the opening, shoulders on the socket portions expand lock the fastener to strips having aligned holes through which the fastener was passed. The fastener is useful with different aperture sizes and different material thicknesses.

U.S. Pat. No. 3,449,799 discloses a fastener comprising a body having a head and a shank extending from the head, each having a bore therethrough. The shank is formed with a plurality of fingers with a groove on its outer side to form wings adapted to be spread apart against a surface surrounding an aperture upon application of a force on the inside of the finger. The fastener allows for different size apertures and does not rotate in the aperture. It also allows for connecting metal to glass and isolates the metal from glass. However, this fastener employs an internal screw for securing the members and is not a locking seal.

U.S. Pat. No. 3,074,134 discloses fastening means for securing automotive trim to a body. A retainer is attached to the trim and passes through an aperture in the automotive body sheet metal. A nose portion has expansible cam shaped parts. The parts have flexible connections to a head. Serrations in the parts mate with other serrations on the under side of the head to lock the parts.

U.S. Pat. No. 3,417,438 discloses a polymeric fastening device with a loop like body, a drive pin initially integral with the body to be sheared from the body, and moved into the body and a pair of spaced opposite cam elements engaging the drive pin to spread deformation of the body upon pressure being applied to the drive pin.

U.S. Pat. No. 3,897,162 discloses a non-releasable connecting device including first and second elements each of which have an elongated shaft and generally flat circular head portions. The shafts cooperate in sliding engagement. The first element shaft is inserted into the second element shaft, the second element having a split shaft. A locking member of the first element passes through a slot in the head of the second element followed by rotation of the first element and subsequent retraction to cause the locking member to engage internal recesses in the second element and permanently lock the elements together.

U.S. Pat. No. 3,954,295 discloses tamperproof shackle seals including a plug portion for cooperation with a mating portion of a socket mouth to prevent effective insertion of a blade. A stop is formed on a strap near the plug to limit effective length of the strap. Resilient fingers are in the socket.

U.S. Pat. No. 4,075,742 discloses a rod shaped locking member and a casing having a cavity for receiving the locking member. A tapered section of the locking member is inserted into a slit sleeve fixed in the casing. A shoulder abuts the sleeve to prevent axial retraction of the locking member. The locking member is axially advanced into the casing to reach a second stage. The rod shaped member is concealed.

U.S. Pat. No. 4,318,650 discloses a one piece plastic rivet having an open frame body laterally expandable and a cylindrical appendix within the body formed with a pull shank for producing the expansion. The appendix has projection means which cooperate with a stepped aperture in the head of the plug rivet for maintaining the body expanded.

U.S. Pat. No. 5,775,860 discloses a plastic rivet and integral drive pin having a head and shank. Resilient legs are attached to the shank which has a transverse hole forming deflectable walls. Protrusions project from the legs and walls. A shank drive pin is driven into the body.

Still other arrangements are disclosed in U.S. Pats. Nos. 5,509,182, 5,568,675 and 5,846,039. In addition, numerous other locking seals, fastening and locking devices are known.

The '162 patent requires access to both sides of a structure being fastened preventing use with tote bin lids. This is also true of devices disclosed also in U.S. Pat. Nos. 4,318,650, 4,920,618, and others. Others of the patents are useable primarily with holes of fixed dimensions or do not serve as appropriate locking seals for tote bins.

A seal for securing overlying apertured first and second members according to the present invention comprises a hollow body extending in an axial direction along an axis and having opposing first and second ends, the body having a transversely compressible distortable annular wall extending about the axis for passing through and in engagement with a plurality of different transversely dimensioned apertures. A locking flange is secured to the body at the first end and at least one radially resilient tang is at the second end for axially locking the body to the members in cooperation with the flange. As a result, the compressible body is able to accommodate and fit with tote bins having lids to be secured with different diameter apertures to which the seal is to be attached.

In one aspect, the body is non-circular, for example, oval, in transverse section.

In a further aspect, the at least one tang includes an elongated stem that extends axially from the body and a hook that extends radially outwardly and in a reverse axial direction from the stem at a stem end distal the body.

Preferably, an axially extending stiffening rib is secured to the stem and wall. This insures that the tangs are not too flexible and thus easily released by tampering.

In a further aspect, the rib is triangular in transverse shape.

In a further aspect, the body may be hollow. In a still further aspect, the annular wall defines an axially extending central hollow core, the seal further including a web secured to one side of the wall in the core at the first end and extending transversely across the core to an opposing side of the wall. Preferably the web is secured to and one piece with the opposing side wall.

In a further aspect, an annular array of a plurality of the tangs is included, the body defining a hollow central core that is elongated in a first transverse direction relative to the axis, the core having opposing ends in the first direction, a first plurality of the tangs being at one end of the core and a second plurality of tangs at the other opposite end of the core in the first direction.

In a further aspect, the first and second plurality of tangs are in like mirror image arrays and spaced from each other in the first direction. In this way, the tangs are at opposite ends of an oval body and enhance the locking action of the tangs.

In a further aspect, the flange is sheet material and extends from the body normal to the axis, further including a transverse hinge for permitting the flange to be selectively folded parallel to the axis. This permits indicia on the flange to be read when the seal is on each of a stack of tote bins. In addition, the flange includes projections for releasably securing the folded flange in the folded state.

Preferably in a further aspect, a locking insert is included for insertion into the core, the insert including a bifurcated shank defining a pair of legs for receiving the web therebetween. The web may then be secured to the legs by projections on the legs further precluding removal of the insert from the body.

For example, at least one of the legs may have a locking tab cooperating with the other leg for forming a locking opening medially the length of the legs, the locking opening for receiving the web and for cooperatively axially locking the insert to the web in the core to preclude the at least one tang from radially inwardly resiliently displacement.

Preferably the flange includes weakening means at the junction of the flange to the body to permit the flange to be removed from the body to unlock the members.

Preferably the body is elongated in a first direction transverse the axis and foreshortened in a second transverse direction normal to the first direction.

IN THE DRAWING

FIG. 2 is a top plan view of an embodiment of a seal according to the present invention;

FIG. 3 is a side elevation view of the seal of FIG. 2;

FIG. 4 is a bottom plan view of the embodiment of the seal of FIG. 2;

FIG. 7 is a more detailed view of the seal of FIG. 3 taken at region 7;

FIG. 8 is a more detailed view of the seal of FIG. 3 taken at region A;

FIG. 9 is a more detailed view of the seal of FIG. 4 taken at region B;

Figure 1:
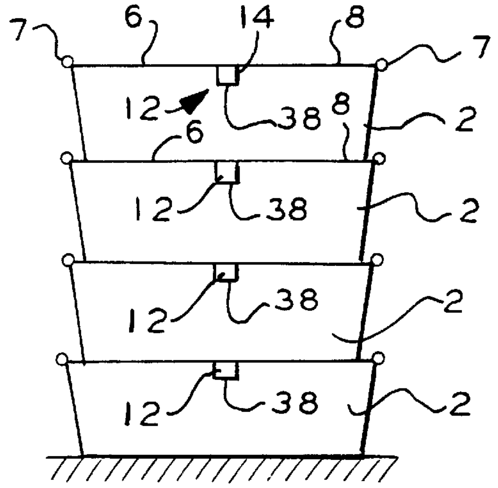
FIG. 1 is a side elevation view of a stack of tote bins employing a seal according to an embodiment of the present invention.

In FIG. 1, tote bins 2 are of the same construction and are widely used, for example, in retail stores and warehouses for storing or handling goods. The bins 2 have a pair of lids 4 and 6, FIG. 13, which are hinged to side walls of the bin 2 by hinges 7. The lids 4 and 6 each have an aperture 8 and 10 respectively which apertures align when the lids are closed in the position of FIG. 13. Typically, the bins 2 are plastic molded material including the lids. The bins 2 may be made by different manufacturers. The hole diameters of apertures 8 and 10 may differ among the bins, either due to differences in tolerances in manufacture or due to different manufacturing specifications. The holes may also be oval.

These bins, when used in retail stores, may need only low level security. In some cases they may need a higher level of security. The seals also need to be easily removed without tools. The security of the seals is that they are provided with unique indicia such as serial numbers, bar codes and the like. Once a seal is removed it can not be reused, and thus a replacement seal with a new ID is easily detected. A low level seal may be more easily tampered with than a high level seal. The level of security is determined by the user. The seal of the present invention meets all of the above needs.

One problem presented by the stacked bins of FIG. 1 is that typically the seals are placed over the lids so that when the bins are stacked, the seals are covered by the overlying bin. This makes it difficult to easily read the seal IDs to determine if tampering has occurred or for other purposes to which such IDs may be employed. As shown in FIG. 1, seals 12 have flanges 14 which are visible regardless the stacked arrangement of the bins 2.

Figure 10:
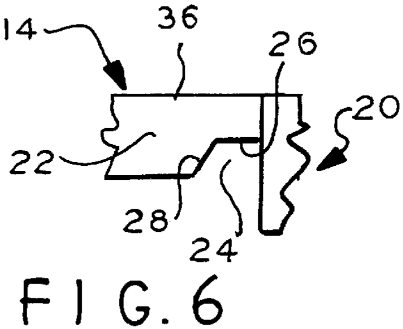
FIG. 10 is a more detailed view of the seal of FIG. 6 taken at region C.
Figure 5:
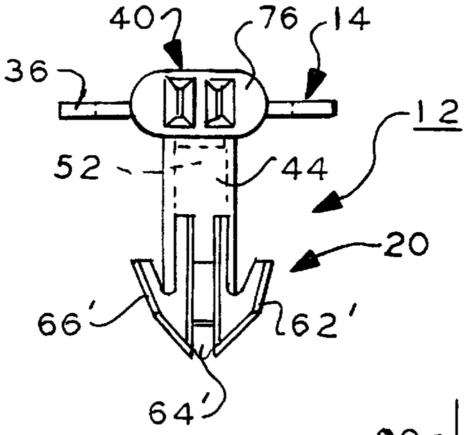
FIG. 5 is an end elevation view of the seal of FIG. 2 taken along lines 5—5.
Figure 6:
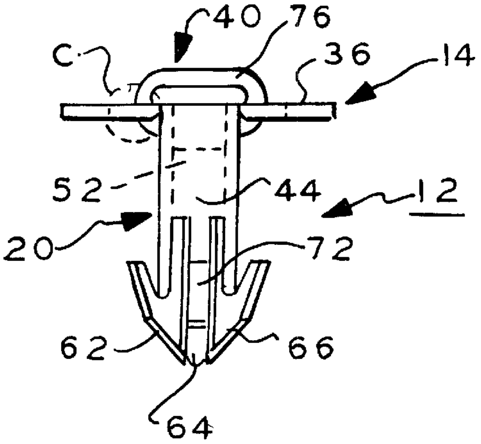
FIG. 6 is an end elevation view of the seal of FIG. 2 taken along lines 6—6.

In FIG. 2, seal 12 is preferably one piece integral molded thermoplastic material. The seal 12 has a flange 14 which has indicia comprising an identification serial number 16 and associated bar code 18 manifesting the serial number. The flange 14, sometimes referred to in this art as a flag, is a relatively thin flat sheet material member. The flange 14 at one end is attached to locking device 20 by a pair of mirror image opposing yoke-like arcuate arms 22. The arms 22 are attached to the device 20 by a weakening groove 24, FIGS. 10 and 11. For molding purposes, the groove 24, FIG. 10 is a linear channel with a flat bottom wall 26 and an inclined flange arm 22 side wall 28. The groove 24 permits the flange 14 to be twisted free of the device 20 without substantially affecting the outer diametrical dimensions of the device 20 to permit the lids 6 and 8, FIG. 1, of the bins 2 to be opened.

In FIG. 2, the flange 14 has a transverse living hinge 30. In FIG. 8, the hinge 30 comprises a relatively deep groove 32 formed in one surface of the flange 14 and a relatively shallow groove 34 formed in the opposite surface of the flange in opposing relation to groove 32. The grooves 32 and 34 divide the flange into two portions 36 and 38 forming a living hinge. A living hinge is where flexible material of relatively thin cross section is bent forming a hinge in the material, the hinge being formed typically by one or more grooves in the material to thin the material at the hinge. Portion 38 has the indicia 16 and 18 whereas the portion 36 is secured to the locking device 20 for locking the device 20 to the bin lids. In FIG. 1, the flange 14 is bent over at the hinge 30 exposing the flange portion 38 with the indicia. Thus the indicia may be read on each seal of the stack of bins 2 without having to remove any of the bins from the stack.

A locking insert 40 is attached to the flange 14 portion 38 distal the locking device 20 and extends coplanar with the flange 14. The insert is attached to the flange 14 portion 38 by a reduced section 42 so that the insert 40 may be removed from the flange by shearing it free.

Figure 11:
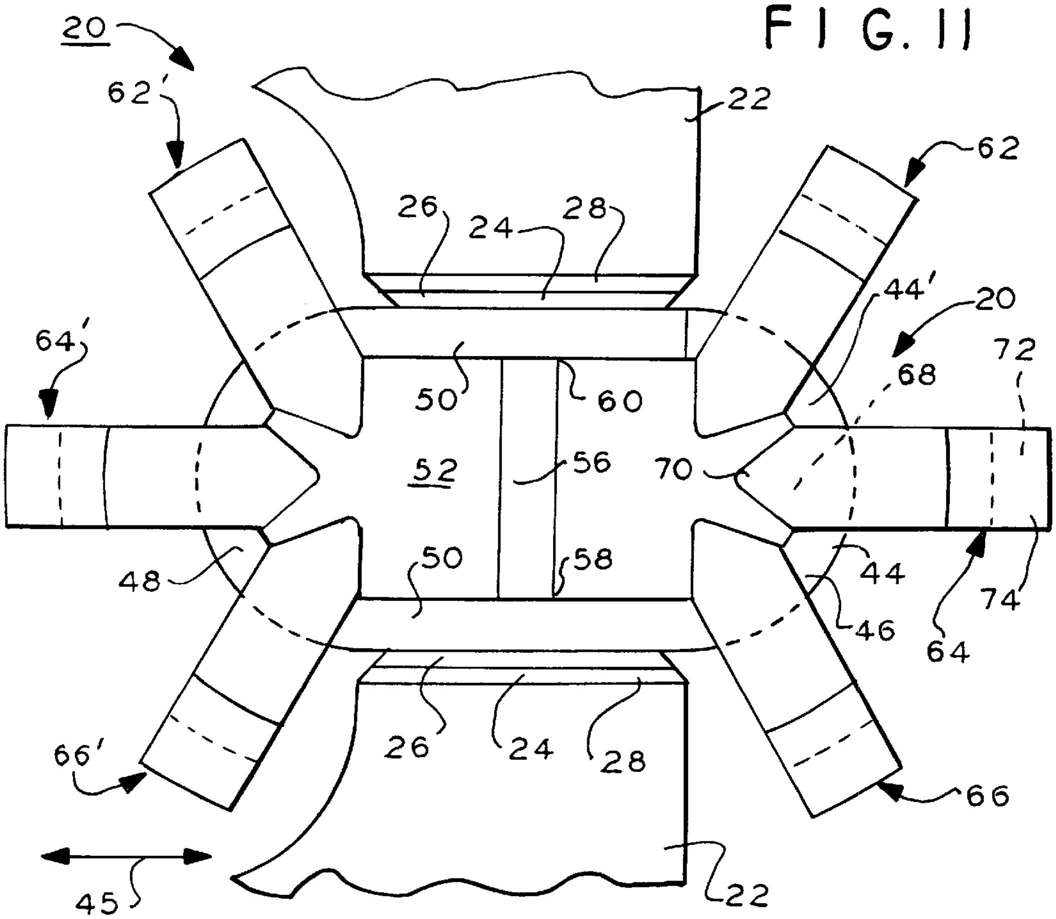
FIG. 11 is a more detailed view of the seal of FIG. 4 taken at region D.

In FIGS. 2–4 and 11, the locking device 20 comprises a thin walled body 44. The body 44 has an oval-like wall 44' which is elongated in directions 45. The body 44 has mirror image opposing semi-circular end sections 46, 48 and a pair of parallel opposite side walls 50 forming a rectangular medial section. The body 44 has a hollow core 52 which extends along the body 44 axis 54, FIG. 3. In FIG. 11, a rectangular in transverse section transverse web 56, which is optional, extends medially to and between the walls 50. The web 56 is molded integral and one piece with the body 44. In an alternative arrangement, the web 56 is attached only to one of the walls 50 at junction 58 and is free of the opposite wall at junction 60. The web 56 may be severed at junction 60 if molded to the side walls at both junctions if desired. In a further alternative, the web 56 may terminate spaced from the wall 50 at junction 60, if desired. The body 44 walls including walls 50, and the walls of sections 46 and 48 are preferably uniform in thickness which may be about 0.8 mm thermoplastic material in one embodiment. The web 56 may also be about 0.8 mm thick thermoplastic material. The walls 50 may be about 50 mm in length and spaced apart about 36 mm. The web 56 is at the flange 14 end of the body 44, FIG. 3, has a portion that lies in the plane of the flange and depends into the core 52, FIG. 3, from the upper edge of the body 44 at walls 50.

A plurality of substantially identical radially resilient tangs 62, 64 and 66 depend from the body 44 wall section 46 wall 44' in an array in the axial direction of axis 54 (FIG. 3) and a substantially identical array of tangs 62', 64' and 66' depend from body wall section 48 in mirror image fashion as the tangs 62–66. Representative tang 64, FIGS. 3 and 11, comprises an elongated stem 68 which has an outer surface that follows and continues the arcuate contour of the body section 46. The stem is an extension of the wall of section 46. A triangular stem stiffening rib 70 is radially interior the stem 68 and continues through the body 44 core 52 flush with the body 44 upper edge at the flange 14. The tang 64 has a reversely directed hook 72 joined to the stem at its lowermost end distal the body 44 by a thickened portion 74. The hook 72 extends radially outwardly of the stem 68 so as to envelop and subtend an oval-like region with the other tang hooks that is substantially larger than the region defined by the body 44 in the axial direction of axis 54. All of the tangs 62, 64 and 66 depending from the section 46 thus are also in a semi-circular array at this end region of the body (the ends being defined relative to the plane of the flange 14, left to right in FIG. 11, the left side being one end and the right side being at the other opposite end normal to the axis 54) and the other tangs 62', 64' and 66' at the other end region of the body are thus also in a semi-circular array. These two arrays of tangs are spaced a distance corresponding generally to about the lengths of the walls 50. The tangs including the stems 68 and ribs 70 and hooks 72 are all radially resilient relative to axis 54.

The insert 40, FIGS. 2–4, comprises an elongated head 76. The head is chamfered on its peripheral edges. The head is shown generally oval similar to the body 44 transverse shape. In the alternative, the head 76 may be rectangular or any other suitable shape. A bifurcated shank 78 extends from the head 76 forming a pair of mirror image legs 80. The legs 80 are each rectangular in transverse section. The legs each have a locking tab 82. In FIG. 9, the locking tabs are mirror images and have a shoulder 84 forming a rectangular opening 86 with the legs 80 and head 76, the opening 86 being internal the insert 40. A ramped projection 88, FIGS. 2, 4, and 7, is on opposing edges of each of the legs 80 with the incline facing away from the head 76. The space between the projections 88 and the head 76 just accommodates and is dimensioned to receive and lock the insert to the body 44.

Figure 13:
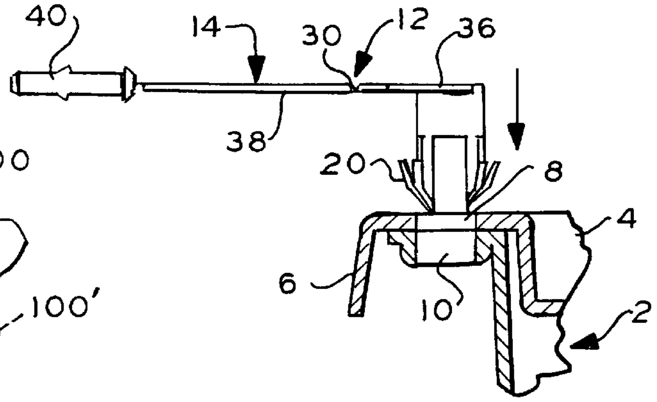
FIG. 13 is a side elevation view partially in section showing the assembling of the seal of FIG. 3 to overlying tote bin lids.
Figure 14:
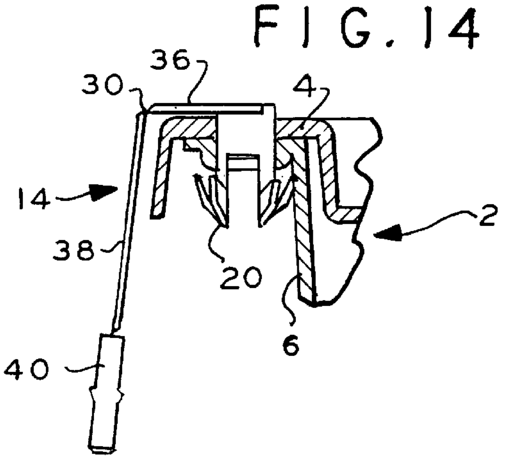
FIG. 14 is a side elevation view partially in section similar to the view of FIG. 13 showing the final assembly of the seal of FIG. 3 to the overlying tote bin lids and the ID flange bent over at a hinge.

In operation, the seal 12 locking device 20 is pushed from the exterior of the bin 2, FIG. 13, into the openings 10 in the lids until the tangs pass through the openings. This action radially compresses the tangs including the sterns and hooks during the insertion. After passing through the openings the tangs resiliently return to the normal position of FIG. 14, locking the lids closed. The flange 14 portion 38 is then bent over at the hinge 30 so that the portion 38 is somewhat parallel to the axis 54 (FIG. 3) as depicted in FIG. 14. The flange portion does not have to be exactly parallel as long as it is visible in a direction normal to axis 54 from the side of the bin as seen in FIG. 1. The insert 40 remains attached to the flange in this embodiment, which is a low level security. It is deemed low level security because the tangs might be tampered with by a determined person to compress the tangs to withdraw the seal from the lids of the bin.

Figure 17:
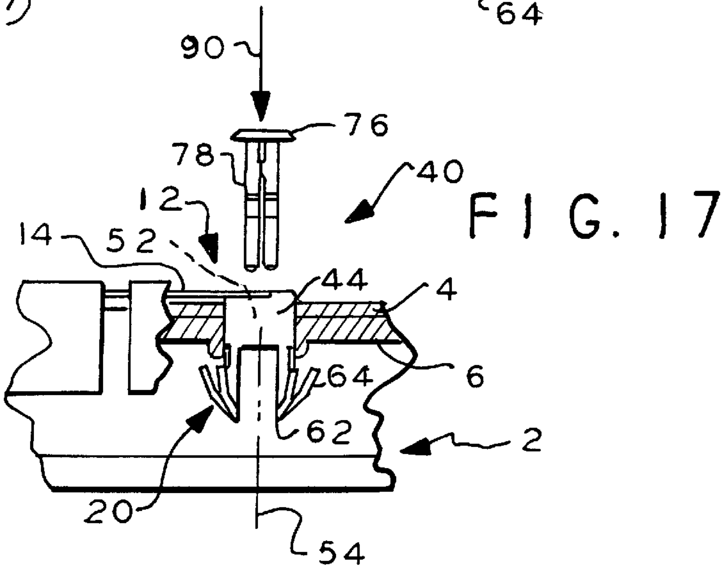
FIG. 17 is a side elevation view partially in section showing an assembly stage of the sheared off locking insert of the embodiment of FIG. 14 into the previously assembled seal to provide increased security.
Figure 18A:
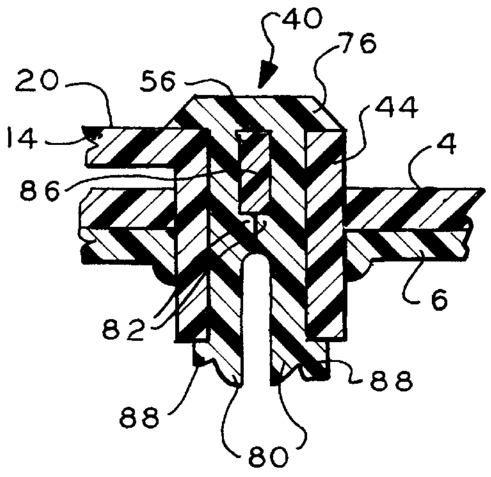
FIG. 18 is a sectional side elevation view of the seal of FIG. 17 after the locking insert is assembled in to the core of the seal body.
Figure 18:
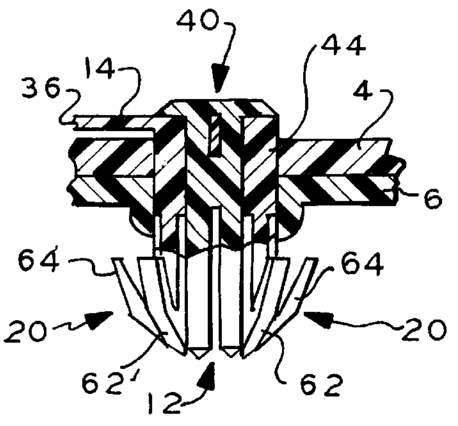

In a higher secure mode, the insert is sheared from the flange 14 at the weakened section 42, FIG. 1. The insert 40, FIG. 17 is then inserted into the body 44 core 52, direction 90. The bifurcated legs 80 pass over web 56 in the body 44 core 52, FIGS. 18 and 19. The legs can pass through the core with the projections 88 due to the compressibility of the plastic material used. The projections 88 may extend a minimal distance from the leg surfaces sufficient to form a locking action with the body 44. The projections snap return to the normal position at the bottom edge of the body 44 distal the flange 14 locking the body 44 between the projections 88, FIG. 19, and the head 76.

Figure 19:
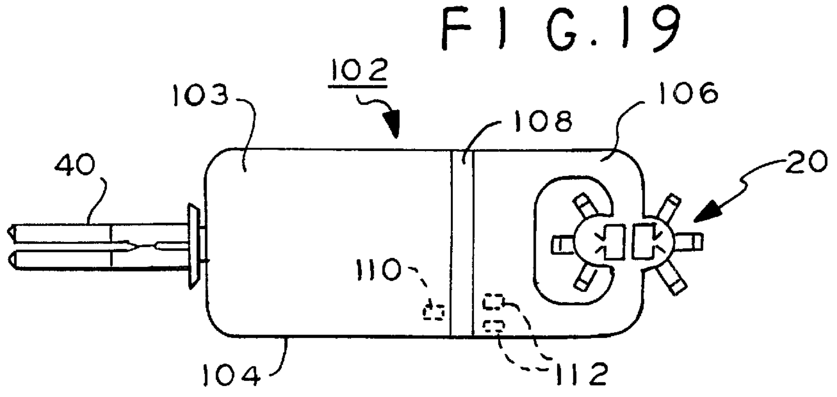
FIG. 19 is a plan view of a seal according to a further embodiment.
Figure 20:
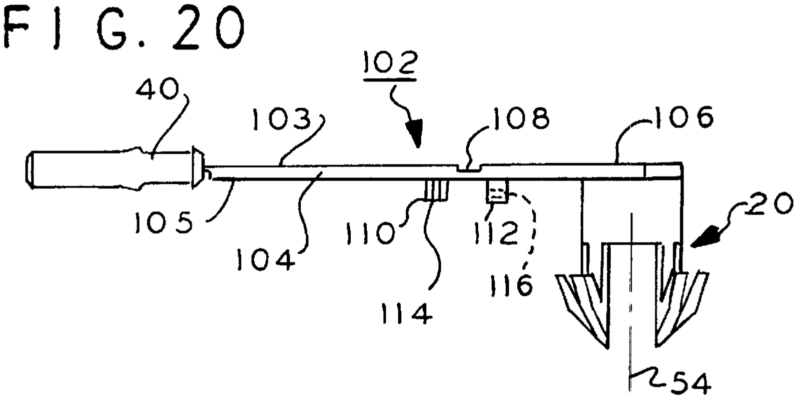
FIG. 20 is a side elevation view of the seal of FIG. 19.
Figure 21:
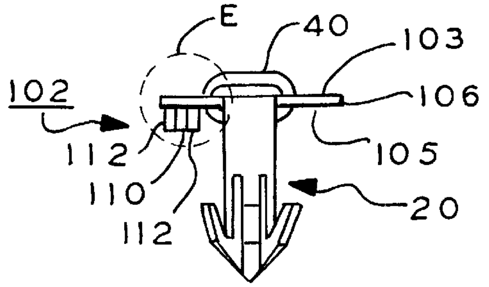
FIG. 21 is an end elevation view of the seal of FIG. 19.
Figure 22:
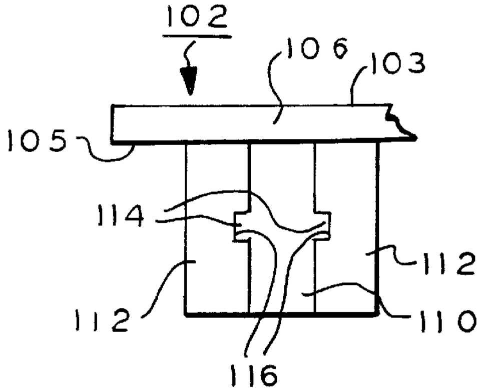
FIG. 22 is a more detailed view of the region E of the seal of FIG. 21.

The web 56 at the same time engages the opening 86 in the shank of the insert 44 (FIG. 19). The tabs 82 lock the web 56 in place to the body 44. The insert 40 prevents the tangs from being radially displaced inwardly providing further security to the seal. The chamfered edge of the head 76 of the insert also tends to make tampering more difficult by making it difficult to grip the insert in an attempt to remove it.

To open the lids, the flange 14 is twisted until it breaks free of the body at groove 24, FIG. 11. The flange breaks free of the body 44 without leaving a significant stub which might otherwise interfere with opening of the lids where the lid openings closely match the dimensions of the body 44 outer periphery. Once the flange is removed, the body 44 of the device 20 is no longer locked to the lids.

Figure 12:
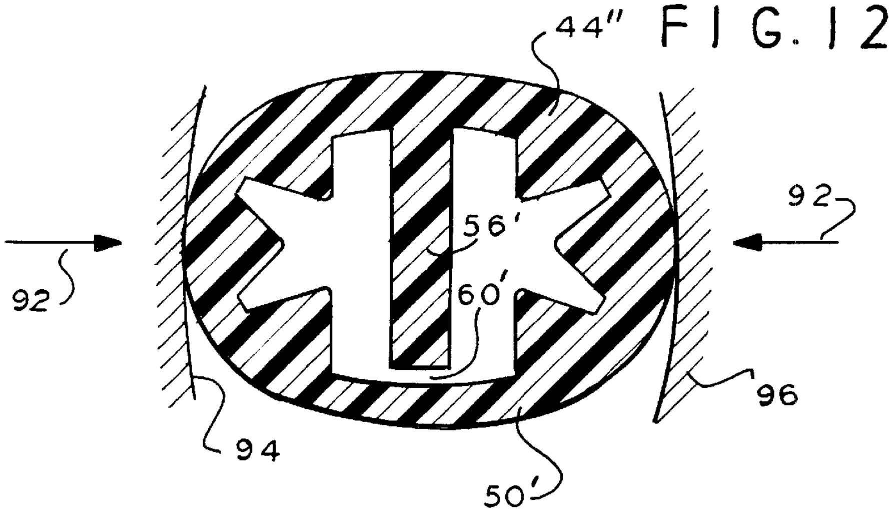
FIG. 12 is a sectional plan view of the engagement of the seal of the present invention ;with a hole in a tote bin lid useful for showing some of the principles of the present invention.
Figure 16:
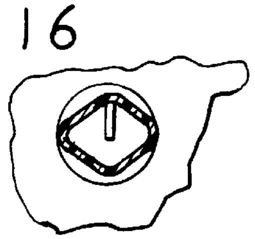

An important advantage of the body 44 oval shape is that it is readily compressible in the longitudinal direction of the oval shape from left to right in the drawing FIG. 11. In some cases the bin apertures 10, FIG. 13, which may be circular or oval, have a diametrical or other transverse dimension smaller than the length of the body 44 normal to the axis 54 from left to right in the drawing, FIG. 3. In this case, as shown in FIG. 12, the body 44" is squeezed laterally in directions 92 as the body is inserted axially into the aperture 94 of a bin lid 96. A relatively high pushing force can be imposed on the body 44" in the axial direction (normal to the sheet of the drawing) due to the relatively high leverage available. This action compresses the flexible body 44' in directions 92 squeezing the body into the aperture 94. To assist in this flexibility of the body 44", the web 56' at junction 60' is not attached to the body. As the body is distorted, the web 56 can separate from the body wall 50'. See also FIG. 16. The more the body is squeezed in directions 92 the more the web 56' separates from wall 50'.

Figure 15:
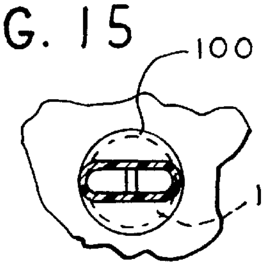
FIGS. 15 and 16 are plan fragmented sectional views of the assembly of the seal of the present invention to different size apertures in mating members.

However, the body 44 remains sufficiently flexible to distort as desired without separating the web 56 at the junction 60' if desired. This is because the body still may compress and distort in the region between the wall of sections 46 and 48, FIG. 11, and the web 56. In the case of a circular aperture in the lid, there will be room for the body to distort in a direction normal to directions 92, FIG. 12. See FIG. 15, wherein should the aperture 100 be reduced to a diameter less than the length (left to right in the figure) of the body (the aperture being shown in phantom in FIG. 15 at 100'), the body can distort between the central web and the body end regions. Different dimensioned inserts (not shown) can be attached in tandem to each other to accommodate different size cores of the locking device bodies after distortion. The central web 56 will lock all such inserts regardless if the outer locking projections 88 securely locking the insert in place in such distorted bodies.

In the disclosed arrangement, six tangs may be employed. However, more or fewer may by used as desired. In the prior art tang arrangements, the bodies are generally solid and the molds used to fabricate the tangs move transversely to the axial direction of the tangs. This limits the number and configuration of the tangs in a plastic molding operation. In the present configuration, the hollow core of the body permits molding of a large number of tangs because the molding dies can now be displaced in the axial direction rather than the transverse direction. Providing more tangs increases the security due to their flexibility. Also the ribs 70 help to stiffen the tangs which otherwise might be too flexible in the transverse direction. If too flexible, the tangs may be easily withdrawn from the locking state without much effort.

In FIGS. 19–22, seal 102 is substantially the same as seal 12 of FIG. 2 except that flange 104 is coupled to flange portion 106 by a transverse rectangular groove 108 (FIGS. 19–20) formed in the upper surface 103 of the flange 104. In addition, the seal 102 differs from the seal 12 in that projections 110 and 112 depend from the bottom surface 105 of the flange 108. The projection 110 fits in the space between the projections 112 when the flange 104 is folded at groove 108 normal to the plane of the flange portion 106 generally parallel to the axis 54 of the device 20. The projection 110, FIG. 22, has ribs 114 on opposite sides thereof. The ribs 114 snap fit into a corresponding groove 116 in each of the projections 112. The grooves 116 are parallel to the flange portion 106. The snap fit occurs when the flange 104 is folded over at the hinge formed by groove 108. The projections 110 and 112 hold the flange 104 in the folded state.

It will occur to one of ordinary skill that various modifications may be made to the disclosed embodiments without departing from the scope of the invention as defined in the appended claims. The various embodiments disclosed are given by way of illustration and not limitation. For example, dimensions, shapes, materials are illustrative. The locking body may be other than oval-like, for example, rectangular, or other geometric arrangements as will meet the desired distortion requirements during insertion of the locking device body.

In addition, the body may be solid, for example, a flat or curved thin member, as well as hollow, if it is sufficiently flexible to be distorted to mate with different dimensioned openings. Also, the body wall may have perforations to afford it the desired flexibility for transverse compression. Also, while projections are shown for holding the folded flange in the folded state, one projection in a first flange portion may mate with an aperture in a second flange portion. While a groove is shown for forming a hinge in the flange, a linear series of perforations through the flange or recesses in the flange may be used for the same purpose. For example, a series of recesses may be provided on the upper and bottom surfaces of the flange to form a living hinge. The weakening regions may be formed by grooves as well as a series of recesses or perforations of any desired shape and configuration.

What is claimed is:

1. A seal for securing overlying apertured first and second members comprising:

a hollow body extending in an axial direction along an axis and having opposing first and second ends, said body having a transversely manually compressible distortable annular wall extending about the axis for passing through and in engagement with a plurality of different transversely dimensioned apertures in said first and second members, the transverse dimension of the wall in a direction generally normal to the axis being compressed during and in response to manual insertion of the body through the apertures in the axial direction;

a locking flange secured to the body at the first end; and at least one radially resilient tang at the second end for axially locking the body to said members in cooperation with the flange whereby the first and second members are secured between the at least one radially resilient tang and the locking flange.

2. The seal of claim 1 wherein said body is non-circular in transverse dimension.

3. The seal of claim 1 wherein said at least one tang includes an elongated stem extending axially from the body and a hook extending radially outwardly and in a reverse axial direction from the stem at a stem end distal the body.

4. The seal of claim 3 further including an axially extending stiffening rib secured to the stem and wall.

5. The seal of claim 4 wherein the rib is triangular in transverse shape.

6. The seal of claim 1 wherein the annular wall defines an axially extending central hollow core, further including a web secured to one side of the wall in the core at said first end and extending transversely across the core to an opposing side of the wall.

7. The seal of claim 6 wherein the web is secured to and one piece with said opposing side wall.

8. The seal of claim 1 including an annular array of a plurality of said tangs, said body defining a hollow central core that is elongated in a first transverse direction relative to said axis, the core having opposing ends in the first direction, a first plurality of said tangs being at one end of said core and a second plurality of tangs at the other opposite end of said central core in said transverse first direction.

9. The seal of claim 8 wherein the first and second plurality of tangs are in like mirror image arrays and spaced from each other in the first direction.

10. The seal of claim 1 wherein the flange is sheet material and extends from the body normal to said axis, further including a transverse groove forming a hinge for permitting the flange to be selectively folded parallel to said axis to a fold position.

11. The seal of claim 10 including a plurality of projections secured to and extending from the flange for holding the flange in said fold position.

12. The seal of claim 6 further including a locking insert for insertion into said core, said insert including a bifurcated shank defining a pair of legs for receiving the web therebetween.

13. The seal of claim 12 wherein at least one of the legs has a locking tab cooperating with the other leg for forming a locking opening medially the length of the legs, said locking opening for receiving the web and for cooperatively axially locking the insert to the web in said core to preclude said at least one tang from radially inwardly resiliently displacement.

14. The seal of claim 1 wherein the flange includes weakening means at the junction of the flange to the body to permit the flange to be removed from the body to unlock the members.

15. The seal of claim 1 wherein the body is elongated in a first direction transverse the axis and foreshortened in a second transverse direction normal to the first direction.

16. The seal of claim 1 wherein the body is hollow.

17. A seal for locking first and second overlapping members having aligned first and second circular apertures, the seal comprising:

a thermoplastic hollow elongate distortable body defined by an outer peripheral wall and extending along an axis, the body being generally oval in a direction generally normal to said axis and defining a major axis in said normal direction, the body having first and second ends and for insertion through said aligned apertures in an axial direction, said body for transverse compressive distortion generally in said normal direction in response to a transverse squeezing force on said wall in response to manual axial insertion into said apertures such that the body is operatively receptive in a plurality of different diameter circular apertures at least a portion of which is smaller than said major axis;

a plurality of radially resilient locking tangs secured to and about the first end for insertion through said apertures for axial locking engagement with the members; and a flange secured to the second end, the flange and tangs for cooperatively locking the members therebetween whereby the first and second members are secured between the plurality of radially resilient tangs and the locking flange.

18. The seal of claim 17 including a radially inwardly extending stiffening rib associated with each said tang extending for the axial length of the body and tang.

19. The seal of claim 17 wherein the body defines an axially extending hollow core, further including a locking insert for insertion into the core for precluding the tangs from radial inward displacement, and a transverse web extending across the core secured to the body for mating with and locking to the insert.

20. A seal comprising:

a body extending in a longitudinal axial direction along an axis and having opposing first and second ends, said body for engagement with a plurality of aligned apertures in corresponding members to be sealed;

a planar locking flange secured to the body at the first end and extending generally normal to the axis; and at least one radially resilient tang at the second end for axially locking the body to said members in cooperation with the flange;

said locking flange having a groove forming a living hinge so that a first flange portion may be folded relative to a second flange portion to a folded position generally parallel to the axis whereby the corresponding members are secured between the at least one radially resilient tang and the locking flange.

21. The seal of claim 20 including means coupled to the flange for holding the first portion in the folded position.

22. A seal comprising:

a body extending in an axial direction along an axis and having opposing first and second ends, said body for engagement with a plurality of aligned apertures in corresponding members to be sealed;

a locking flange secured to the body at the first end;

at least one radially resilient tang at the second end for axially locking the body to said members in cooperation with the flange;

said locking flange having a groove forming a living hinge so that a first flange portion may be folded relative to a second flange portion to a folded position; and means coupled to the flange for holding the first portion in the folded position.

23. A seal for securing overlying apertured first and second members comprising:

a hollow body extending in an axial direction along an axis and having opposing first and second ends, said body having a transversely compressible distortable annular wall extending about the axis for passing through and in engagement with a plurality of different transversely dimensioned apertures in said first and second members;

a locking flange secured to the body at the first end; and at least one radially resilient tang at the second end for axially locking the body to said members in cooperation with the flange;

the annular wall defining an axially extending central hollow core, further including a web secured to one side of the wall in the core at said first end and extending transversely across the core to an opposing side of the wall.

24. A seal for securing overlying apertured first and second members comprising:

a hollow body extending in an axial direction along an axis and having opposing first and second ends, said body having a transversely compressible distortable annular wall extending about the axis for passing through and in engagement with a plurality of different transversely dimensioned apertures in said first and second members;

a locking flange secured to the body at the first end;

at least one radially resilient tang at the second end for axially locking the body to said members in cooperation with the flange; and an annular array of a plurality of said tangs, said body defining a hollow central core that is elongated in a first transverse direction relative to said axis, the core having opposing ends in the first direction, a first plurality of said tangs being at one end of said core and a second plurality of tangs at the other opposite end of said central core in said transverse first direction.

25. A seal for securing overlying apertured first and second members comprising:

a hollow body extending in an axial direction along an axis and having opposing first and second ends, said body having a transversely compressible distortable annular wall extending about the axis for passing through and in engagement with a plurality of different transversely dimensioned apertures in said first and second members;

a locking flange secured to the body at the first end; and at least one radially resilient tang at the second end for axially locking the body to said members in cooperation with the flange;

the flange being sheet material and extending from the body normal to said axis; and further including a transverse groove forming a hinge for permitting the flange to be selectively folded parallel to said axis to a fold position.

26. A seal for securing overlying apertured first and second members comprising:

a hollow body extending in an axial direction along an axis and having opposing first and second ends, said body having a transversely compressible distortable annular wall extending about the axis for passing through and in engagement with a plurality of different transversely dimensioned apertures in said first and second members;

a locking flange secured to the body at the first end;

at least one radially resilient tang at the second end for axially locking the body to said members in cooperation with the flange; and weakening means at the junction of the flange to the body to permit the flange to be removed from the body to unlock the members.

* * * * *